E. B. AULT.
BEE SHIPPING CAGE.
APPLICATION FILED SEPT. 30, 1920.
1,388,085.
Patented Aug. 16, 1921.
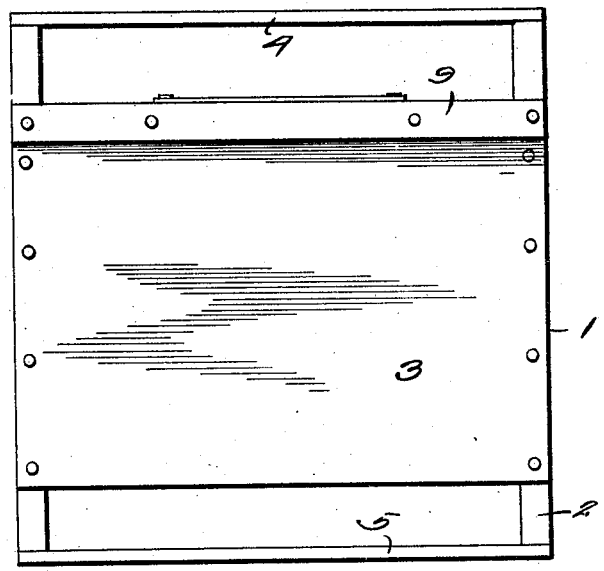
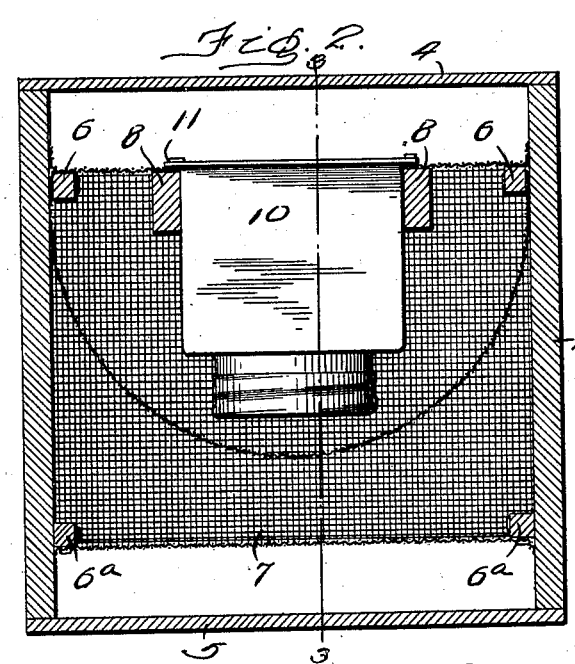
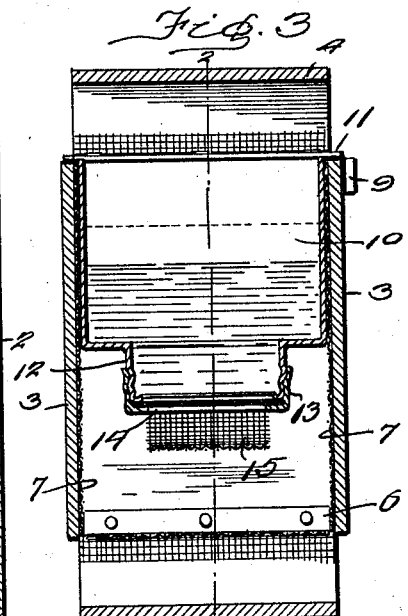
Eugene B. Ault, INVENTOR.
BY Geo. P. Kimmel, ATTORNEY.

UNITED STATES PATENT OFFICE.

EUGENE B. AULT, OF CALALLEN, TEXAS.

BEE-SHIPPING CAGE.

1,388,085.     Specification of Letters Patent.     Patented Aug. 16, 1921.

Application filed September 30, 1920. Serial No. 413,706.

*To all whom it may concern:*

Be it known that I, EUGENE B. AULT, a citizen of the United States, residing at Calallen, in the county of Nueces and State of Texas, have invented certain new and useful Improvements in Bee-Shipping Cages, of which the following is a specification.

This invention relates to a shipping cage for transporting bees and to feeders therefor.

The main object of the invention is to provide a bee shipping cage so constructed as to protect the bees against light and also the cage against injury by expressmen and to prevent all possibility of the bees escaping, incident to such injury.

Another object is to provide a cage of this character open on its sides at the top and bottom to insure proper ventilation.

Another object is to provide a liquid feeder for a bee shipping cage so constructed that the bees will at all times be supplied with ample food and yet waste, incident to jolts which occur during transit, is prevented.

Another object is to provide a bee feeder for shipping cages which while affording feeding space for a comparatively large number of bees which may suck out the feed if they need it, will not easily become clogged.

With these and other objects in view, the invention consists in certain novel features of construction as hereinafter shown and described and then specifically pointed out in the claims, and in the drawings illustrative of the preferred embodiment of the invention.

In the accompanying drawing:

Figure 1 represents a side elevation of a bee shipping cage constructed in accordance with this invention.

Fig. 2 is a longitudinal section thereof taken on the line 2—2 of Fig. 3, and,

Fig. 3 is a transverse vertical section taken on the line 3—3 of Fig. 2.

The cage constituting this invention comprises a crate 1 composed of solid end members 2 and side members 3, the sides 3 being shorter than the end members and arranged so as to form a ventilating space at the top and bottom thereof. An imperforate top 4 and a similar bottom 5 are supported on the end members 2 to afford protection for the bees against careless expressmen. Arranged within the crate 1 is a bee confining chamber 7 constructed of foraminous material preferably of screen wire which extends around the ends and sides of the crate and spans the space between the top edges and bottom edges of the side members forming a perforate container for the bees. The air entering through the bottom of the crate passes up through the container 7 and out at the top of the crate on the sides thereof insuring proper ventilation for the bees.

Cleats 6 are secured to the inner faces of the end members 2 with their uper faces arranged flush with the top edges of the sides 3 and similar cleats 6ª are secured to said end members with their lower faces flush with the lower edges of said side members and form supports for the container 7 which is secured thereto by any suitable means.

Cross bars 8 connect the side members 3 at their upper ends and are spaced apart a sufficient distance to receive between them the liquid feed container 10 as is shown clearly in Figs. 2 and 3. This container 10 is preferably in the form of a rectangular metal can having laterally projecting flanges 11 at the top thereof which are designed to rest on the cross bars 8 and be fixed thereto by suitable fasteners so that the container will be securely held in the cage in inverted position. This container has a screw threaded neck 12 with which is engaged a cap 13 open on its outer face and which is designed to fit over a foraminous covering 14 which is held engaged with the neck by said cap. This cover 14 is preferably made of heavy cloth loosely woven and the liquid feed contained in the can 10 will rest thereon and may be sucked therethrough by the bees when needed. This cloth cover 14 which extends over the entire mouth of the container 10 will afford a large feeding area for the bees and while permitting them to suck the feed therethrough is sufficiently thick to prevent the feed from being forced out by jolts incident to traveling.

The cap 13 having threaded connection with the can neck 12 cannot become accidentally detached and will thus avoid any danger of the syrup or other liquid feed being accidentally discharged which frequently happens when friction caps are used.

A foraminous strip 15 is attached at its ends to the end members 2 of the crate inside the container 7 and extends down under the mouth of the can 10 and forms a perch or rest for the bees.

The preferred embodiment of the invention is disclosed in the drawings and set forth in the specification, but it will be understood that any modifications within the scope of the claims may be made in the construction without departing from the principle of the invention or sacrificing any of its advantages.

What is claimed is:

1. A bee shipping cage comprising a crate closed except at the top and bottom of the sides thereof, a screen wire bee retaining cage mounted in said crate, and a feeder in said cage.

2. A bee shipping cage comprising a crate closed except at the top and bottom of the sides thereof, a foraminous lining mounted in said crate and extending across and connecting the top and bottom edges of the sides of the crate, a feed container supported in said crate within said lining and having its mouth depending downwardly, and a foraminous closure for said mouth.

3. A bee shipping cage comprising a crate closed except at the top and bottom of the sides thereof, a foraminous lining mounted in said crate and extending across and connecting the top and bottom edges of the sides of the crate, a feed container supported in said crate within said lining and having its mouth depending downwardly, and a foraminous closure for said mouth, and a screw cap for holding said closure in operative position.

In testimony whereof, I affix my signature hereto.

EUGENE B. AULT.